Aug. 27, 1968  J. ALESI, JR., ET AL  3,398,434

VACUUM FORMING APPARATUS

Filed Dec. 7, 1965  7 Sheets-Sheet 1

INVENTORS.
JOHN ALESI JR
JOHN A. ALESI

BY Fulwider, Patton, Rieber,
Lee and Utecht
ATTORNEYS.

INVENTORS.
JOHN ALESI JR.
JOHN A. ALESI
BY Fulwider, Patton, Rieber,
Lee and Utecht
ATTORNEYS.

United States Patent Office 3,398,434
Patented Aug. 27, 1968

3,398,434
VACUUM FORMING APPARATUS
John Alesi, Jr., and John A. Alesi, Los Angeles, Calif.,
assignors to Formex Manufacturing Inc., Santa Monica,
Calif., a corporation of California
Continuation-in-part of application Ser. No. 248,596,
Dec. 31, 1962. This application Dec. 7, 1965, Ser.
No. 512,164
13 Claims. (Cl. 18—19)

ABSTRACT OF THE DISCLOSURE

A method and apparatus for forming two sheets of heat-fusible plastic into a hollow structure and concurrently fusing the edges of each sheet together in a substantially continuous seam. First and second frame means support the edges of the heat-fusible plastic sheets and are moved by transfer means between an oven and first and second mold halves. The mold halves are formed with complementary edges inwardly of which are defined mold cavities that cooperate to define the shape of the hollow structure. A vacuum is applied between the heated sheets and their respective mold cavities to draw the sheets into the mold cavities, with the mold halves then being urged together to cause the heated sheets to be fused under pressure in a seam. Air may be circulated within the space between the formed plastic sheets during the forming operation to thereby accelerate hardening of the plastic sheets. The edges of the mold halves may be formed with completmentary pockets that squeeze more of the material of the plastic sheets inwardly of the edges than is squeezed outwardly of the edges so as to increase the strength of the bond between the plastic sheets and also providing an extremely thin flash. To expedite formation of the seam, the edge portions of the mold halves may be provided with auxiliary heating elements. To prevent the heated upper and lower plastic sheets from mutual contact and consequent sticking together, air may be forced therebetween. Alternatively, the lower sheet may be heated to a higher temperature than the upper sheet or the lower sheet may be thinner than the upper sheet whereby such lower sheet will sag farther downwardly than the upper sheet.

---

This is a continuation-in-part of patent application Ser. No. 248,596, filed Dec. 31, 1962 now Patent No. 3,256,-565 grant June 21, 1966.

The present invention relates generally to the art of molding and more particularly to a novel apparatus for forming thermoplastic sheets into a hollow structure.

It is a major object of the present invention to provide an apparatus for forming two sheets of heat-fusible plastic into a hollow structure and concurrently fusing the edges of each sheet together in a substantially continuous seam. The use of the method and apparatus of the present invention permits hollow structures to be formed at a faster rate and far more economically than has hitherto been possible.

It is another object of the present invention to provide an apparatus of the aforedescribed nature utilizing first and second frame means that support the edges of the heat-fusible plastic sheets, such frame means being movable by transfer means between an oven and first and second mold halves, with such mold halves having complementary edges inwardly of which are defined mold cavities that cooperate to define the shape of the hollow structure. A vacuum is applied between the heated sheets and their respective mold cavities to draw the sheets into the confines of the mold cavities, such mold halves thereafter being urged together to cause the heated sheets to be engaged under pressure along the periphery of the hollow structure to thereby fuse the sheets together in a seam along such periphery.

A further objection of the present invention is to provide an apparatus of the aforedescribed nature wherein both sides of the plastic sheets are concurrently exposed to heat before forming thereby affording maximum pliability of the sheets during the forming operation and most effective fusing of the sheets together.

Another object of the present invention is to provide an apparatus of the present invention wherein air is circulated within the space between the formed plastic sheets while the latter are being formed to thereby accelerate the hardening of the plastic sheets.

An additional object is to provide an apparatus of the aforedescribed nature wherein a seam is produced between the plastic sheets that is thicker than the wall thickness of such sheets thereby increasing the strength of the bond between the sheets.

Yet another object of the present invention is to provide an apparatus of the aforedescribed nature employing means that positively prevent the heated plastic sheets from sticking together except along the seam.

These and other objects and advantages of the present invention will become clear from the following detailed description, when taken in conjunction with the appended drawings wherein:

FIGURE 10 is a front elevational view of a third form of apparatus embodying the present invention;

FIGURE 18 is a fragmentary enlarged view showing a seam-forming step of the operation performed by the apparatus of FIGURES 10 and 11;

FIGURE 19 is a view similar to FIGURE 18, but showing a later step in the seam forming step; and FIGURE 20 is an enlarged broken view showing the seam formed by the step of FIGURES 18 and 19.

Referring to the drawings and particularly FIGURES 1 through 6 thereof, a first form of apparatus embodying the present invention is indicated generally at 10. This apparatus includes a frame 11 having vertical posts 12 and 13 and top horizontal channels 14 and 15. Posts 12 and 13 are fixed to the floor 16 by base channels 17 and 18, respectively.

Channels 14 and 15 are provided with a horizontal top plate 19 on which a vertically extending double-acting ram unit 20 is rigidly mounted. Ram 20 is of conventional construction having a piston rod 21 connected to a piston (not shown) disposed within a cylinder 22 in a manner well known to those skilled in the art. The piston rod 21 extends downwardly through the lower end of the cylinder 22 and is vertically reciprocated in the usual manner by the admission and discharge of a fluid such as compressed air to the upper and lower ends of the cylinder 22. A horizontal upper platen 24 is rigidly secured to the lower end of piston rod 21, such platen supporting an upper mold 23.

Figures 1, 2:
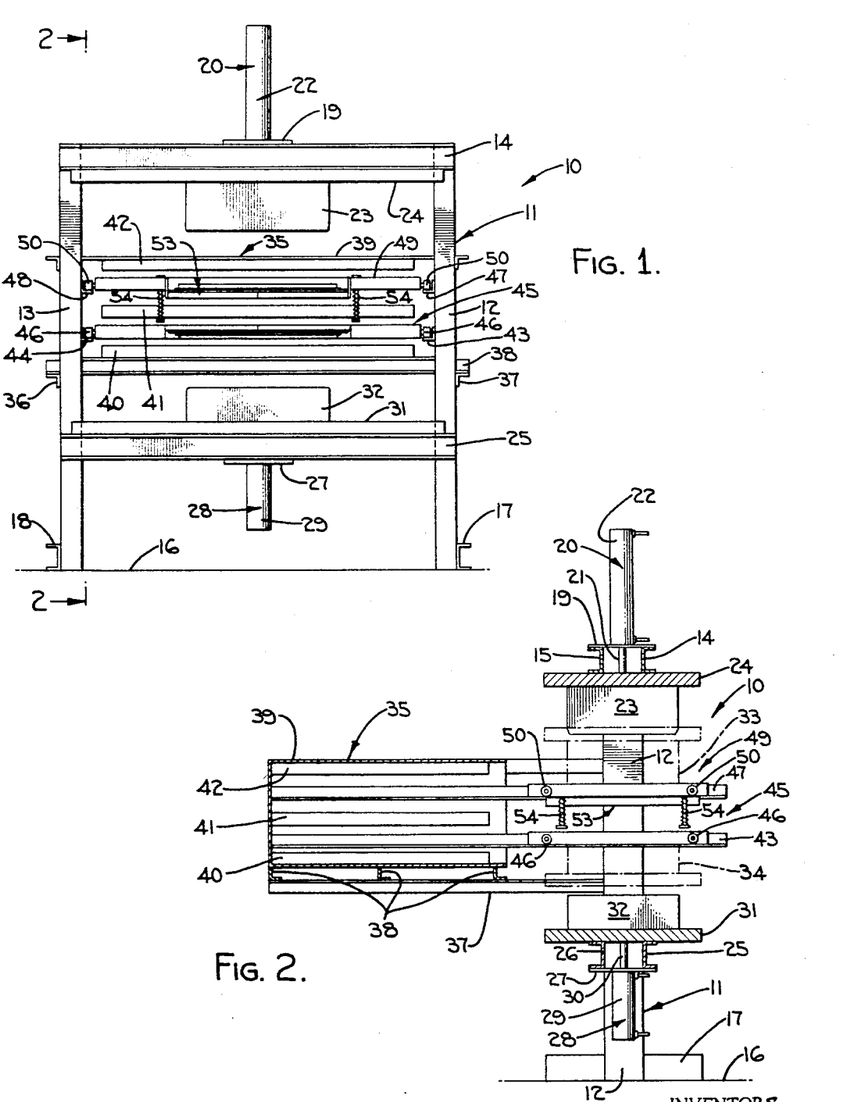
FIGURE 1 is a front elevational view of a first form of apparatus embodying the present invention.
FIGURE 2 is a vertical sectional view taken along line 2—2 of FIGURE 1.

Posts 12 and 13 are bridged at their lower portion by a pair of parallel horizontal channel members 25 and 26, such channel members being rigidly affixed to opposite sides of the posts 12 and 13, as indicated particularly in FIGURE 2. A horizontal plate 27 is affixed to the underside of the center of the channel members 25 and 26. The plate 27 supports a lower double-acting ram unit 28 having a cylinder 29 through the upper end of which slidably extends a coaxial piston rod 30. The piston rod 30 is connected at its lower end to a piston slidably disposed within the cylinder 29 in a conventional manner. The upper end of piston rod 30 is affixed to a horizontal platen 31. A lower mold 32 is rigidly supported upon the platen 31.

From the above description it will be clear that upper and lower molds and platens 23, 24 and 31, 32, respectively, are movable vertically between the open position shown in solid lines in FIGURE 2 to the phantom line closed position of this figure by suitable operation of the upper and lower rams 20 and 28, respectively.

With further reference to FIGURE 2 an oven 35 is supported to the left of the posts 12 and 13 on upper and lower pairs of like parallel horizontal structural members 36, 37 and 36a, 37a, with the right-hand portion of the latter being rigidly affixed to the intermediate portion of the vertical posts 13 and 12, respectively. The longitudinal structural elements 36 and 37 are bridged by three horizontally extending transverse supports 38. The oven 35 includes a housing or enclosure 39 inside of which are mounted lower, intermediate and upper sets of heating elements 40, 41 and 42, respectively. The latter may be of conventional construction, such as electric resistance type grids.

Disposed intermediate the lower heating element 40 and the intermediate heating element 41 are a pair of parallel horizontally aligned longitudinal tracks 43 and 44. These tracks extend from the rear or left-hand portion of the oven 35 relative to FIGURE 2 to a point spaced to the front of the molds 23 and 32. The lower tracks 43 and 44 support a lower carriage 45 provided with wheels 46, such wheels resting upon the tracks 43 and 44 whereby the carriage 45 may be rolled between the confines of the oven 35 to a position vertically aligned with the molds 23 and 32. A similar pair of upper tracks 47 and 48 are arranged intermediate the upper heating element 42 and the intermediate heating element 41. The upper tracks 47 and 48 support an upper carriage 49 provided with wheels 50 whereby the upper carriage 49 may be moved between the confines of the oven 35 and a position vertically aligned with the molds 23 and 32.

Figure 3:
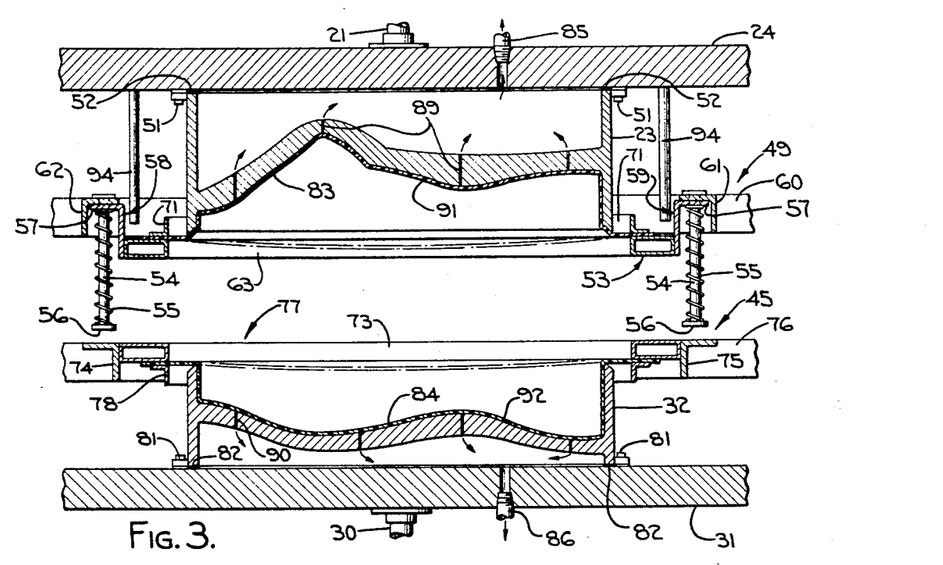
FIGURE 3 is a vertical sectional view taken in enlarged scale along line 3—3 of FIGURE 1 and showing the molding section of said apparatus in an open position.
Figure 4:
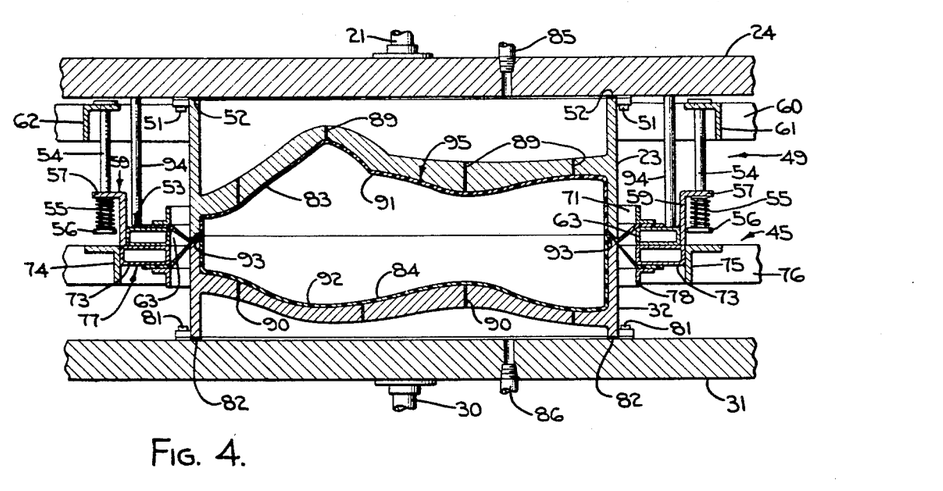
FIGURE 4 is a view similar to FIGURE 3 but showing the parts of the mold section in a closed position.

As indicated particularly in FIGURES 3 and 4 the upper mold 23 is secured to the upper platen 24 by means of bolts 51. A seal 52 may be interposed between the mold 23 and the platen 24. Similarly, lower mold 32 is secured to lower platen 31 by bolts 81, with a seal 52 being provided between the mold and the platen.

The upper carriage 49 supports an upper plastic sheet-supporting framework, generally designated 53, by means of four vertical shafts 54. Each shaft is provided with an encircling coil compression spring 55, the lower end of each shaft being formed with an enlarged spring retainer 56. The shafts 54 depend from cross-bars 61 and 62 that bridge longitudinal side pieces 60 of the upper carriage 49, as shown particularly in FIGURES 3 and 4.

Figure 5:
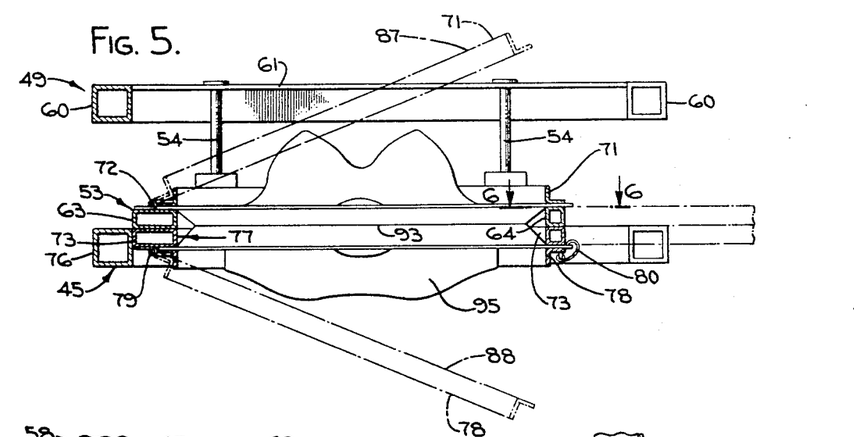
FIGURE 5 is an end view taken in partial vertical section showing a plastic sheet-supporting frame-work assembly utilized with said apparatus.

The upper framework 53 includes an open, rectangular framepiece 53a, the ends of which are provided with ears 58 and 59 that are apertured to slidably receive the aforementioned shafts 54. Upper framework 53 also includes an open, rectangular plastic sheet retainer 71. As indicated in FIGURE 5, the retainer 71 is pivotally secured to one side of the base 53a by hinge pins 72. With this arrangement, the retainer frame 71 may be pivoted between its solid line position of FIGURE 1 and its phantom line position shown in this figure.

The lower carriage 45 rigidly supports a lower plastic sheet-supporting framework, generally designated 77. The framework 77 includes an open, rectangular framepiece 53a generally similar to framepiece 53a of the upper framework 53. Framepiece 73a is secured to cross-bars 74 and 75 that bridge longitudinal side pieces 76 of lower carriage 45. A rectangular, open plastic sheet retainer 78 is hingedly connected to one side of the base 77a by means of hinge pins 79. The hinge pins 79 are vertically aligned with the hinge pins 72 secured to the upper framepiece 53a. Hooks 80 are utilized to secure retainers 71 and 78 in their closed position. As shown particularly in FIGURE 5, this arrangement permits the upper and lower retainers to be pivoted between their closed solid outline position of this figure and their phantom like open position therein.

The upper platen 24 is provided with conduit 85 having communication with the space between the underside of the platen 24 and the upper or exterior surface of the mold 23. Lower platen 31 is provided with a similar conduit 86. The upper and lower molds 23 and 32 are formed with a plurality of air passages 89 and 90, respectively, connecting the spaces between the mold exteriors and the upper and lower platens with the mold cavities defined by the upper and lower mold cavities 83 and 84, respectively. A plurality of stop pins 94 depend from the upper platen 24 in vertical alignment with the framepiece 53a of upper framework 53.

The aforedescribed apparatus may be employed to form a hollow structure from first and second sheets 91 and 92 of heat-fusible plastic. In the present description the hollow structure takes the form of a mannequin trunk. It should be clearly understood, however, that the showing of a mannequin trunk is purely exemplary and many types of hollow structures can be formed with the apparatus and method of the present invention.

In the operation of the aforedescribed apparatus, the upper and lower molds 23 and 32 are moved to their open position shown in solid outline in FIGURES 1 and 2. The upper and lower carriages 45 and 49 are positioned in front of the oven 35, i.e., to the right of the oven in this figure. Flat upper and lower plastic sheets 91 and 92 are positioned within the upper and lower frameworks 53 and 77. This is accomplished by pivoting the upper and lower retainers 71 and 78 to their open position shown in phantom outline in FIGURE 5. With these retainers in their open position the plastic sheets 91 and 92, respectively, are engaged with the upper and lower framepieces 53a and 73a, respectively. The upper retainer 71 is then lowered to its solid outline position of FIGURE 5 and the lower retainer 78 is raised to its solid outline position of this figure. Hooks 80 are then employed to secure retainers 71 and 78 in their closed position.

Thereafter, the upper and lower carriages 49 and 45 are moved into the confines of the oven 35 whereby the plastic sheets 91 and 92 are heated to a temperature at which they can be formed and fused together under pressure. It should be particularly noted that the upper and lower surfaces of both plastic sheets 91 and 92 are concurrently heated because of the use of the upper, intermediate and lower heating elements 40, 41 and 42.

After the plastic sheets 91 and 92 have been sufficiently heated, the upper and lower carriages 49 and 45 are moved forwardly out of oven 35 on tracks 46 and 47 into vertical alignment with one another and with the open upper and lower molds 23 and 32. The upper and lower molds 23 and 32 are then moved towards the heated plastic sheets 91 and 92 until the edges of the molds engage the plastic sheets. Air is withdrawn from mold cavities 83 and 84 by means of conduits 85 and 86 and the mold passages 89 and 90, as indicated in FIGURE 3. This withdrawal of air from the mold cavities serves to draw the plastic sheets 91 and 92 into the confines of the upper and lower mold cavities 83 and 84, respectively, whereby the plastic sheets will assume the configuration defined by the mold cavities. Continued vertical movement of the upper and lower molds 23 and 32 towards one another will effect the engagement of their edges, as indicated in FIGURE 4. Referring particularly to this figure, the engagement of the heated plastic sheets 91 and 92 under pressure along the edges the molds 23 and 32 fuses the plastic sheets together in a seam 93 along the periphery of the hollow structure.

It should be particularly observed that because both sides of the plastic sheets were heated such sheets will have maximum pliability as they are drawn into the mold cavities. Also, because the proximate sides of the sheets were heated as well as the remote sides, the fusing step is rendered most efficient. With continued reference to FIGURE 4, it will be observed that as the upper and lower molds approach one another, the lower ends of the stop pins 94 engage the framepiece 53a of the upper framework 53. Thereafter, downward movement of the platen 24 is transferred to the upper framework 53 by the stop pins 94. Relative movement between the upper framework 53 and the upper carriage 49 is permitted by the aforementioned yielding interconnection afforded by the shafts 54 and the spring 55.

The upper and lower molds will then be again separated. Thereafter, frameworks 53 and 77 are removed from between the molds whereby the completed plastic hollow structure may be readily released from the frameworks. A second pair of plastic sheets are then loaded into the frameworks.

Figures 6, 7:
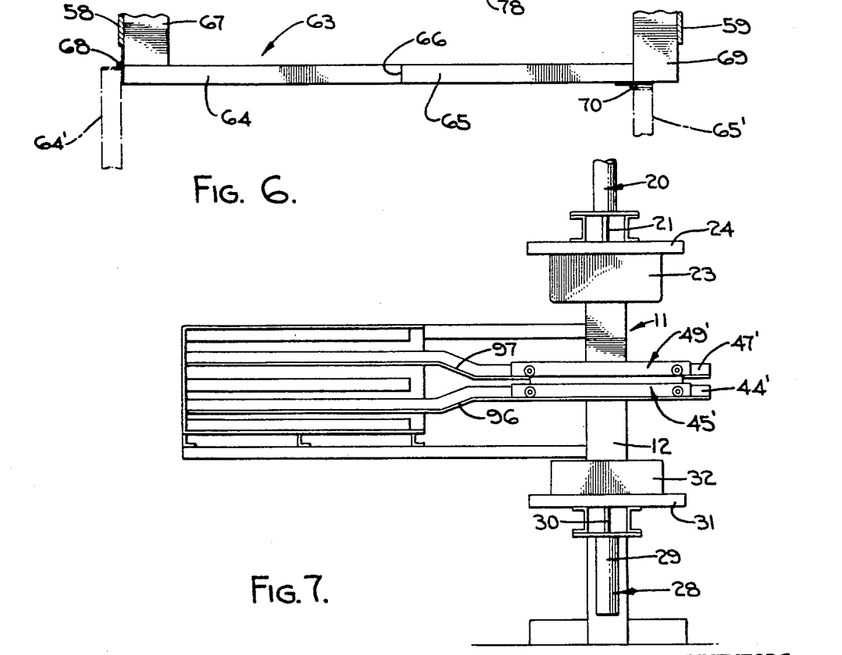
FIGURE 6 is a broken horizontal sectional view taken on line 6—6 of FIGURE 5.
FIGURE 7 is a side elevational view of a second form of apparatus embodying the present invention.
Figure 8:
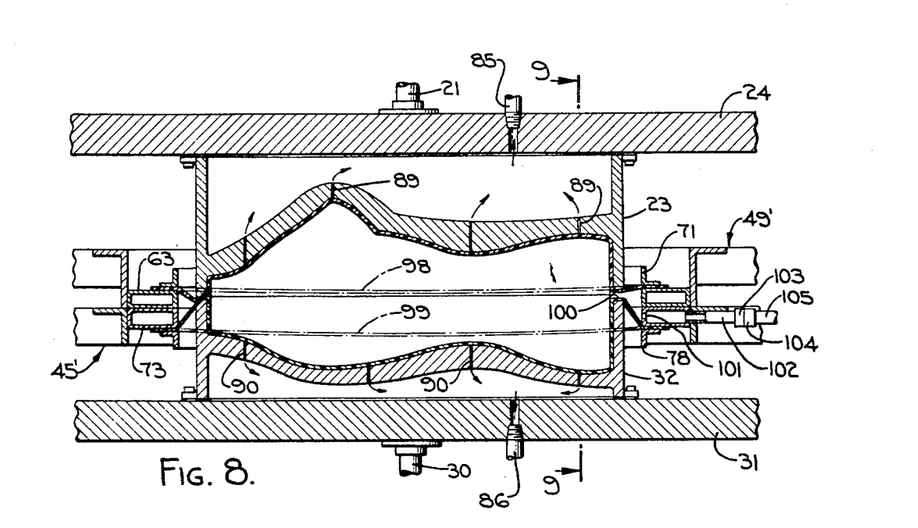
FIGURE 8 is a vertical sectional view taken in enlarged scale along line 8—8 of FIGURE 7.
Figure 9:
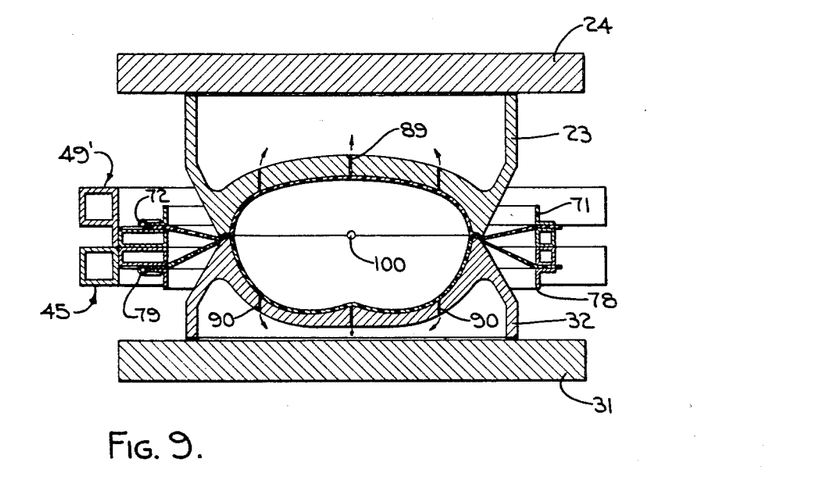
FIGURE 9 is a vertical sectional view taken along line 9—9 of FIGURE 8.

Referring now to FIGURES 7, 8 and 9 there is shown a second form of apparatus embodying the present invention. The construction of this second form of apparatus may be generally similar to the construction of the apparatus shown in FIGURES 1 through 6 except that the tracks 44' and 47' supporting the lower and upper carriages 45' and 49' are not horizontal as in the case of the first form of apparatus. Instead, track 44' is formed at its intermediate portion with an upwardly and forwardly extending length 96. Upper track 47' is formed at its intermediate portion with a downwardly and forwardly extending length 97 aligned with length 96 of the lower track. Additionally, the upper framework 53a' of the second form of apparatus is fixedly supported relative to the upper carriage 49' rather than being yieldably supported relative thereto. This will be made clear by reference to FIGURES 8 and 9. It should be particularly noted that the vertical spacing between the tracks 44' and 47' in line with the upper and lower molds 23 and 32 are such that when the lower and upper carriages 45' and 49' are moved into vertical alignment the frameworks 53' and 73' will be closely spaced relative to one another.

In order to prevent the heated upper and lower plastic sheets 98 and 99 from mutual contact and consequent sticking together, the apparatus of FIGURES 7, 8 and 9 is provided with means for introducing air between these plastic sheets. Thus, an opening 100 is formed at the midportion of the right-hand side of the molds 23' and 32', as particularly indicated in FIGURE 9. The opening 100 is adapted to receive air under super atmospheric pressure through an opening 101 formed in the lower framepiece 73, and a tube 102 secured to and having communication with the interior of framepiece 73a'. A check valve 103 is connected to tube 102. A quick-detachable coupling 104 for an air hose 105 is connected to check valve 103 in a conventional manner.

It should be noted that the heated upper and lower sheets 98 and 99 may also be prevented from mutual contact by effecting differential sagging of such sheets. Thus, if the lower sheet 99 is caused to sag farther than the upper sheet 98 the upper sheet will not contact the lower sheet. Such differential sagging may be accomplished by heating the lower sheet to a higher temperature than the upper sheet. Alternatively, a lower sheet of less thickness than the upper sheet may be employed.

In the operation of the apparatus shown in FIGURES 7, 8 and 9, the upper and lower plastic sheets 98 and 99 will be heated in oven 35'. Thereafter, the carriages 45' and 49' will be moved into vertical alignment with the upper and lower molds 23' and 32', as indicated in FIGURE 7. As the carriages 45' and 49' are moving together along sections 96 and 97 of tracks 44' and 47', respectively, air may be introduced between the heated plastic sheets 98 and 99 to insure against such sheets contacting one another. When the upper and lower frameworks 53' and 73' are aligned with the upper and lower molds 23' and 32' air is withdrawn through conduits 85 and 86, as indicated in FIGURES 8 and 9 so as to draw the heated plastic sheets into the confines of the mold cavities. The introduction of pressurized air between the heated plastic sheets 98 and 99 not only prevents their sticking together, but also aids in imparting surface detail from the molds to the exterior of the plastic sheets where such detail is desired if the air is maintained within the molded object after the sheets are engaged.

Referring now to FIGURES 10 through 20, there is shown a third form of apparatus embodying the present invention. The third form of apparatus embodying the present invention is of the rotary type, i.e., it includes a plurality of working stations, with the plastic sheets that are formed into a hollow structure being successively movable between such work stations. Thus, this apparatus includes a fixed frame, generally designated 200, provided with a loading-unloading station 202, a preheating station 204, an oven station 206 and a molding station 208. The fixed frame 200 includes an upright center post 210 about which rotates a transfer frame T, such transfer frame being employed to move a pair of upper and lower, flat, heat fusible plastic sheets 214 and 216, respectively, between the aforementioned stations.

Transfer frame T includes a cage 220 that includes upper and lower circular plates 222 and 224 coaxial with the center post 210. The plates 222 and 224 are rigidly maintained in vertically spaced relationship by a plurality of fixed vertically extending rods 226. Upper and lower collars 228 and 230 secured to the upper and lower plates 222 and 224 are keyed to the rotatable center post 210 by set screws 231. Four pair of vertically aligned upper and lower framework supports of like construction are supported by the cage 222 and extend radially outwardly therefrom at right angles to one another. Each framework support includes an upper unit, generally designated 232, and a lower unit, generally designated 234. Each of the upper units 232 include a pair of parallel horizontal rails 236 and 238 having a generally E-shaped transverse cross-section, as shown particularly in Figure 17. The radially outer ends of the rails 236 and 238 are formed with a pair of depending legs 240. The radially inner ends of each of the rails 236 and 238 are rigidly affixed as by welding to a vertically extending bushing 244. Each bushing 244 is vertically slidably supported by one of the aforementioned rods 226 of the cage 220.

The upper framework support units 232 are movable vertically on the rods 226 by means of a double-acting cylinder and plunger unit 246 of conventional construction. The cylinder elements of each unit 246 are rigidly affixed to the lower plate 224 of the cage 220, while the piston rod 250 thereof extends upwardly to a horizontal cross-piece 252 that bridges the rails 236 and 238, as shown particularly in Figure 10. Pressurized air is admitted to and discharged from the lower ends of the cylinders 246 by means of a plurality of valves 254 carried by a horizontal plate 256 secured to the lower portion of center post 210. These valves 254 receive pressurized air through a conduit 258 that extends downwardly through the center post 210.

Each of the lower framework support units 234 include a pair of parallel horizontal rails 260 and 262. The radially inner end of each rail 260 and 262 is rigidly affixed to the lower plate 224 of the cage 220. Rails 260 and 262 have the same cross-section as the rails 236 and 238 of the upper framework support 232.

The transfer frame T is rotated through 90 degree increments by means of a horizontally extending double-acting ram 270 that is supported on a plate 271 secured to the upper cross-piece 272 of the fixed frame 200 to one side of the center post 210. The outer end of the cylinder 274 of the ram 270 is pivotally affixed to the plate 271 by means of a vertical pivot pin 276. The piston rod 278 of the ram 270 is extendible towards and away from a horizontal indexing plate 280 that is keyed to the upper end of the center post 210. Each corner of the indexing plate 280 is formed with an upstanding push pin 282. A retractor bar 284 extends away from each pin 282 towards the opposite corner of indexing plate 280 at an angle towards the center of such plate. Each push pin 282 is consecutively engageable with the notch 285 of a pusher element 286 that is fixed to the free end of the piston rod 278. Thus, extension of the piston rod 278 from its solid outline position of Figure 11 to its phantom outline position therein will cause the indexing plate 280 and hence the transfer frame T to undergo clockwise rotation through an arc of 90 degrees. As the piston rod 278 is thereafter retracted, the pusher element 286 will be caused to move outwardly from the center post 210 by engagement with a retractor bar 284. Provision for this outward movement of the pusher element 286 is afforded because of the pivotal mounting of the indexing ram 270 relative to the transfer frame T. Tension spring 288 serves to return the indexing ram 270 to its normal position.

Referring again to Figure 10, the aforementioned air valves 254 that operate the cylinder and piston units 246 are of conventional construction well known to those skilled in the art and include a cam follower 290. The wheeled lower end of each cam follower 290 engages a cylindrical cam 292 that is coaxial with the center post 210 and is fixed to a lower cross-piece 294 of the fixed frame 200. The cam 292 cooperates with the cam followers 290 to admit and discharge air to the lower end of the cylinder and piston units 246 in accordance with the position of the framework support units 232 and 234 relative to the fixed frame 200. In this manner the upper support units 232 are caused to undergo vertical movement as transfer frame T rotates.

Figure 17:
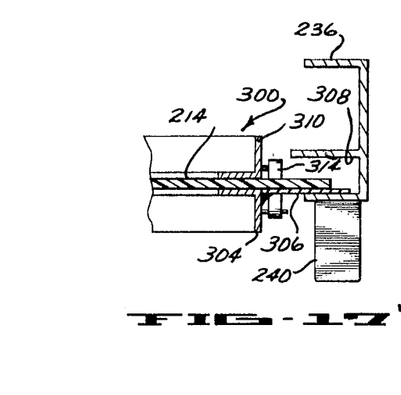
FIGURE 17 is a broken vertical sectional view taken in enlarged scale along line 17—17 of FIGURE 11.

The loading station 202 is the point at which the upper and lower plastic sheets 214 and 216 are transferred to and removed from the transfer frame T. The upper and lower plastic sheets are respectively carried by upper and lower frameworks, generally designated 300 and 302, respectively of like construction. Referring particularly to Figure 17, each of the frameworks 300 and 302 include an open rectangular base framepiece 304 to the sides of which are rigidly affixed by welding an outwardly extending horizontal wing 306. The wing 306 is adapted to be removably received within the inwardly opening horizontal groove 308 defined in the lower portion of the upper and lower rails 236, 238 and 260, 262. An open rectangular upper framepiece 310 is hingedly affixed to one side of the lower framepiece 304 by means of hinges 312 as shown particularly in Figure 11. The opposite side of the upper framepiece 310 is securable to the opposite side of the lower framepiece 304 by suitable conventional latches 314. When the latches 314 are opened the upper framepiece 310 may be pivoted upwardly and a plastic sheet 214 laid upon the lower framepiece 304. The upper framepiece 310 is then lowered and the latches 314 engaged. This arrangement securely clamps the edges of the plastic sheet 214 between the upper and lower framepieces.

The preheating station 204 includes vertically aligned upper, intermediate and lower horizontal heating elements 320, 322 and 324, respectively. These heating elements may be of the conventional electrical resistance type.

Figures 11, 12, 13, 14:
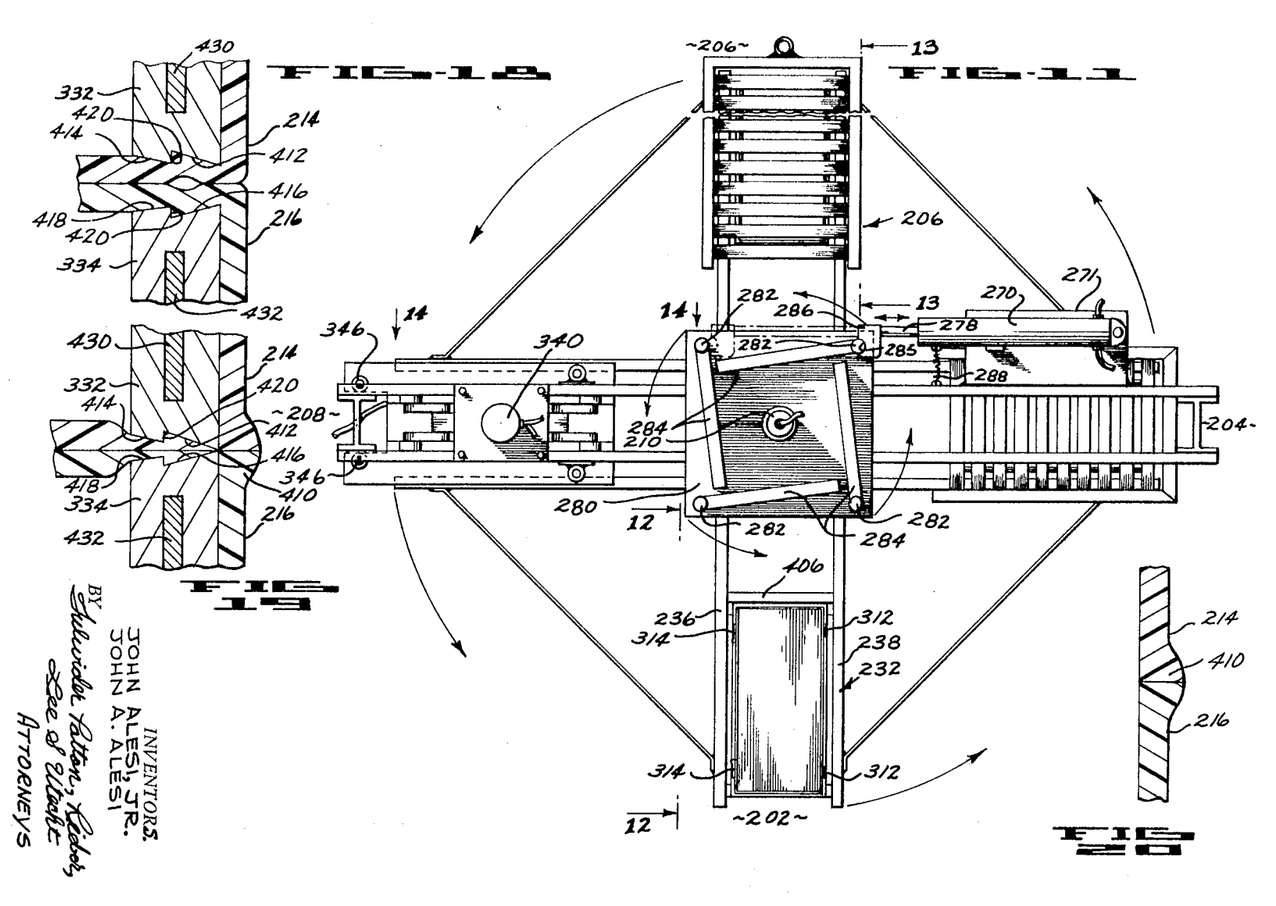
FIGURE 11 is a top plan view of the apparatus of FIGURE 10.
FIGURE 12 is a vertical sectional view taken in enlarged scale on line 12—12 of FIGURE 11 showing the loading section of the apparatus of FIGURES 10 and 11.
FIGURE 13 is a vertical sectional view taken in enlarged scale along line 13—13 of FIGURE 11 showing the oven section of the apparatus of FIGURES 10 and 11.
FIGURES 14, 15 and 16 are vertical sectional views taken in enlarged scale along line 14—14 of FIGURE 11 and showing the operation of the mold section of the apparatus of FIGURES 10 and 11.
Figures 12, 13:
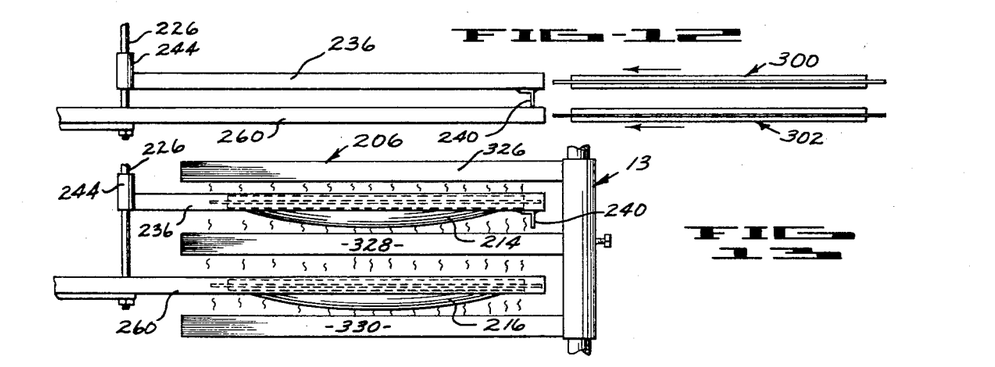
Figure 14:
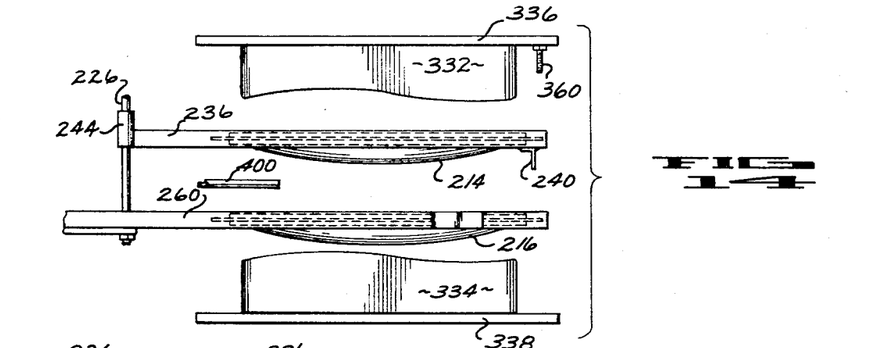

The oven station 206 is generally similar in construction to the preheating station 204 and as indicated in FIGURE 13 includes upper, lower and intermediate heating elements 326, 328 and 330, respectively. These heating elements may be of the same type as employed at the preheating station 204.

The molding station 208 includes vertically aligned upper and lower molds generally designated 332 and 334, respectively, each carried by upper and lower platens 336 and 338, respectively. Vertical reciprocal movement of the molds and platens towards and away from one another is effected by means of upper and lower double acting rams 340 and 342 of conventional construction. The upper platen 336 is carried by an upper platform 344 that is vertically slidable on posts 346 of frame 200, such platform carrying vertical adjustment screws 348. The lower end of adjustment screws 348 are secured to a horizontal plate 358 to which upper platens 336 is affixed. Adjustable stop pins 360 depend from the inner edge of upper platen 336. Upper platform 344 is connected to the piston rod 361 of upper ram 340 by a conventional toggle mechanism 362. Lower platen 338 is carried by a lower platform 364, adjustment screws 365 and lower plate 366 similar to upper platform and plate 344 and 358, respectively. Similarly, lower platform 364 is connected to the piston rod 368 of lower ram 342 by a conventional toggle mechanism 370. Upper and lower platforms 344 and 346 are provided with posts 372 and 374 slidable in bushings 376 and 378 secured to frame 200.

Figure 15:
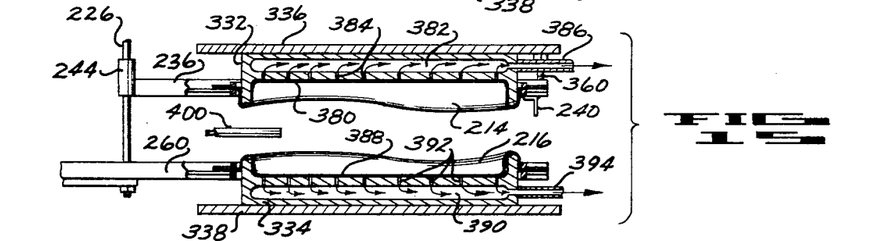
Figure 16:
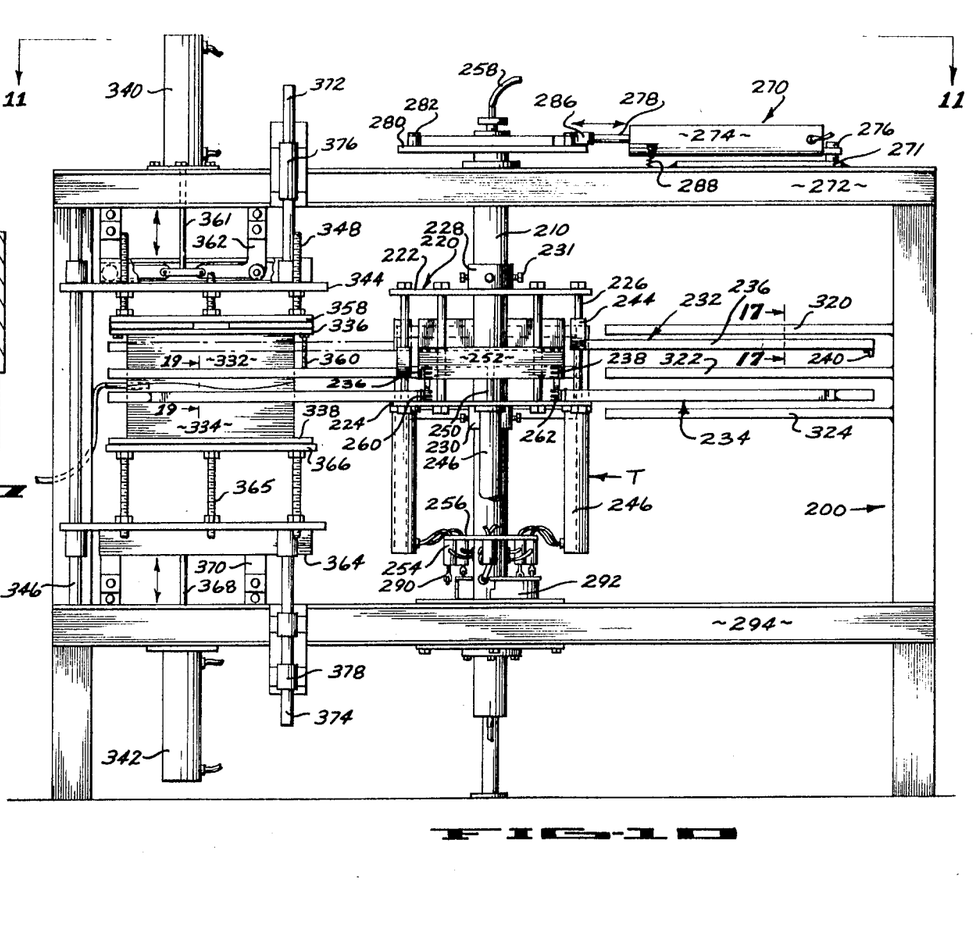

Referring particularly to FIGURE 15, the upper mold 332 is formed with a downwardly-facing mold cavity 380. The interior of the mold 332 is hollow defining a space 382. A plurality of passages 384 interconnect the space 382 and the downwardly-facing exterior surface of the mold cavity 380. The space 382 is in communication with a vacuum tube 386 that extends through one side of mold 332 to a source of vacuum (not shown). Similarly, the lower mold 334 is formed with a mold cavity 388 and with a space 390. The space 390 is in communication with the upwardly-facing exterior side of the mold cavity 388 by a plurality of passages 392 formed in the mold. The space 390 is in communication with a second vacuum tube 394. With further reference to FIGURE 15 and also FIGURE 16, it should be particularly noted that the outer end walls 396 and 398 of the upper and lower molds are centrally cut away to receive an air tube assembly generally designated 400. The air tube assembly 400 includes an outer discharge tube 402 within which is coaxially arranged an inlet tube 404.

In the operation of the apparatus disclosed in FIGURES 10 through 17, a pair of upper and lower flat heat-fusible plastic sheets 214 and 216 are positioned within a pair of upper and lower frameworks 300 and 302. The frameworks 300 and 302 with their plastic sheets are then moved within the confines of the upper and lower framework supports 232 and 234 at the loading-unloading station 202. In this step the frameworks 300 and 302 are moved radially inwardly from their position of FIGURE 12 onto the rails 236, 238 and 260, 262 until the inner ends of these support units abut a stop bar 406 that bridges these rails, as indicated particularly in FIGURE 11. It should be noted that at the loading-unloading station 202 the upper framework support 232 is positioned immediately above lower support 234, the legs 240 of the upper rails 236 and 238 resting upon the upper surface of the lower rails 260 and 262 of the lower framework support 234, as indicated in FIGURE 12.

The transfer frame T is then caused to rotate counter-clockwise 90 degrees so as to move the framework supports 232 and 234 towards the preheating station 204. Prior to the time that the supports 232 and 234 reach the preheating station 204, however, they are raised by means of their cylinder and plunger unit 246 to the position indicated in FIGURE 13. At the preheating station 204 upper and lower surfaces of the plastic sheets 214 and 216 are heated by means of the upper, intermediate and lower heating elements 320, 322 and 324, respectively.

With the upper framework supports 232 still in their raised position, the transfer frame T is rotated counter-clockwise through another 90 degree increment so as to place the framework support units 232 and 234 at the oven station 206. At the oven station 206 the upper and lower surfaces of the plastic sheets 214 and 216 are heated to a temperature at which they can be fused together under pressure. As indicated in FIGURE 13, the plastic sheets 214 and 216 will sag downwardly under the influence of the heat applied thereto.

The transfer frame T is next rotated counter-clockwise through another 90 degree increment so as to dispose the framework support units 232 and 234 at the molding station 208. It should be particularly noted that the upper framework support unit 232 will remain in its raised position during such movement.

As indicated in FIGURE 14, the upper and lower molds 332 and 334 will be open as the framework support units 232 and 234 are aligned therewith. Next, referring to FIGURE 15, the upper and lower molds 332 and 334 are advanced towards one another. As these molds advance towards one another vacuum is applied through tubes 386 and 394. This vacuum serves to draw the upper and lower plastic sheet into their respective mold cavities 380 and 388 to thereby insure such sheets do not engage and stick together.

As indicated in FIGURE 15, downward movement of the upper mold 332 will cause its stop pins 360 to engage the upper framework support 232. With this arrangement, once the stop pins 360 engage the upper framework 232, continued downward movement of the upper mold will apply downward force against the upper framework support 232. It should be noted that as the frame supports 232 and 234 approach the molding station 208 compressed air is released from the respective cylinder and piston unit 246 of the upper support 232 by means of the cylinder's respective valve 254. The air is not released suddenly, however, and instead passes through a metering orifice (not shown) at a controlled rate. This arrangement permits the upper framework support 232 to be moved downwardly under the influence of the stop pins 360 at a relatively slow, controlled velocity. The length of the stop pins 360 should be so selected as to prevent the edges of the upper mold 332 from pushing so far into the upper plastic sheet 214 as to tear such sheet. The lower mold 334 is raised upwardly to the extent permitted by the upward movement available to the lower piston rod 368. The uppermost position of the lower mold 334 should be so adjusted by means of the adjustment screws 365 that the edges of the lower mold will not tear the lower plastic sheet 216.

The upper mold 332 will continue to move downwardly lowering with it the upper support 332 until the edges of the upper and lower molds cause the outer portions of the plastic sheets 214 and 216 to be engaged under pressure along the periphery of the hollow structure defined by the sheets whereby the sheets are fused together in a seam 410 along such periphery. This is the condition shown in FIGURE 16. Referring to this figure, as the upper and lower molds effect engagement of the upper and lower plastic sheets 214 and 216 air is admitted through tube 404 to the interior surfaces of the plastic sheets. After flowing over these surfaces such air will be discharged through discharge tube 402. The recirculation of air through the space between the joined plastic sheets serves to accelerate the hardening process of the plastic sheets whereby the molded object may be removed from the molds in a shorter period of time then if air were not so circulated without appreciably cooling the molds 332 and 334. This permits a maximum molding rate. Preferably, during the time air is being recirculated vacuum is still being applied through tubes 386 and 394.

After the plastic sheets 214 and 216 have hardened sufficiently, the transfer frame T is rotated counter-clockwise through a final 90 degree increment so as to position the upper and lower framework supports 232 and 234 at the loading-unloading station 202. The framework supports will then be removed from the rails 236, 238 and 260, 262 whereafter the hollow molded structure may be removed from the frameworks 300 and 302.

It will be appreciated that at such tmie as the plastic sheets first loaded into the transfer frame T at the loading-unloading station 202 have been moved to the preheating station 204, another pair of plastic sheets will be disposed upon another pair of frameworks and loaded into the upper and lower supports 232 and 234 positioned 90 degrees clockwise relative to the initially loaded framework supports 232 and 234. This procedure will be continually repeated so that each of the upper and lower framework supports 232 and 234 will consecutively receive a pair of frameworks loaded with a pair of plastic sheets.

Referring now to FIGURES 18, 19 and 20, it is preferable that the edges of the upper and lower molds 332 and 334 be formed with means that tend to shear the portions of the plastic sheets 214 and 216 that lie outwardly of the mold edges after the sheets have been fused together in a seam 410. Thus, the lower edge of the upper mold and the upper edge of the lower mold are formed with complementary inner and outer pockets 412, 414 and 416, 418, respectively. The inner pockets 412 and 416 taper outwardly from the inner surfaces of the mold cavities 380 and 388 terminating in a vertical surface 420. The outer pockets 414 and 418 taper outwardly from the intermediate portion of the vertical surface 420, but at a lesser angle that that of the inner pockets.

With this arrangement, as the molds approach one another more of the material of the plastic sheets 214 and 216 is squeezed inwardly by the inner pockets 412 and 416 than is squeezed outwardly by the outer pockets 414 and 418. Accordingly, as shown in FIGURES 18 and 19 the seam 410 formed between the upper and lower plastic sheets is made thicker than the wall thickness of either plastic sheet. This feature increases the strength of the bond between the plastic sheets. Additionally, the outer part of the seam 410 tends to be sheared off by the inner surfaces of the molds. If not actually sheared off, the outer part of the seam 410 presents an an extremely thin flash that is easily trimmed. The resulting seam 410 is shown particularly in FIGURE 20.

With continued reference to FIGURES 18 and 19, auxiliary heating elements 430 and 432 may be positioned at the edge portions of the upper and lower molds if desired to expedite formation of the seam 410 and facilitates shearing off out the outer part of the seam.

Various other modifications' and changes may be made with respect to the foregoing detailed description

We claim:

1. Apparatus for forming two sheets of heat-fusible plastic into a hollow structure comprising:
   first and second frame means that support the edges of said sheets;
   a plurality of spaced-apart, generally flat heating means for said sheets;
   first and second mold halves, each having complementary edges, said mold halves being formed inwardly of said edges with mold cavities that cooperate to define the shape of said hollow structure;
   transfer means for first positioning said frame means adjacent said heating means with each side of both of said sheets being concurrently disposed adjacent one of said heating means whereby both sides of said sheets are heated to a temperature at which they can be fused together, said transfer means thereafter being operable to position said frame means and their respective heated sheets over the edges of said mold halves;
   means for applying a vacuum between said sheets and their respective mold cavities whereby said sheets are drawn into the confines of said respective mold cavities;
   and means for thereafter urging said mold halves together to cause said heated sheets to be engaged under pressure along the periphery of said hollow structure whereby said sheets are fused together in a seam along said periphery.

2. Apparatus as set forth in claim 1 that includes means for circulating air between said plastic sheets after they have been engaged under pressure.

3. Apparatus as set forth in claim 1 wherein the edges of said mold halves are formed with complementary pockets that taper outwardly from the inner surfaces of said mold activities so as to squeeze more of the material of said plastic sheets inwardly of said edges than is squeezed outwardly of said edges.

4. Apparatus as set forth in claim 1 wherein auxiliary heating elements are positioned adjacent said edges of said mold halves.

5. Apparatus as set forth in claim 1 wherein said heating means include upper, lower and intermediate heating elements and said frame means consist of upper and lower frames that are independently movable vertically to position one of said sheets between the upper and intermediate heating element and the other of said sheets between the lower and the intermediate heating element to thereby heat both sides of said sheets.

6. Apparatus as set forth in claim 5 wherein said transfer means include upper and lower carriages that move on upper and lower tracks, with said upper carriage supporting said upper frame and said lower carriage supporting said lower frame.

7. Apparatus as set forth in claim 5 wherein said transfer means includes a transfer frame having a plurality of fixed lower rails and upper rails vertically aligned with and vertically movable with respect to said fixed lower rails to receive said lower and upper frames, respectively, and said transfer frame being rotatable relative to said heating elements and said mold halves to successively position said frames in vertical alignment with said heating elements and then said mold halves.

8. Apparatus as set forth in claim 5 that includes means for circulating air between said plastic sheets after they have been engaged under pressure.

9. Apparatus as set forth in claim 5 wherein the edges of said mold halves are formed with complementary pockets that taper outwardly from the inner surfaces of said mold cavities so as to squeeze more of the material of said plastic sheets inwardly of said edges than is squeezed outwardly of said edges.

10. Apparatus as set forth in claim 5 wherein auxiliary heating elements are positioned adjacent said edges of said mold halves.

11. Apparatus for forming two sheets of heat-fusible plastic into a hollow structure, comprising:
    first and second frame means that support the edges of said sheets;
    upper, lower and intermediate heating elements;
    first and second mold halves, each having complementary edges, said mold halves being formed inwardly of said edges with mold cavities that cooperate to define the shape of said hollow structure;
    transfer means for first positioning said first frame means and its plastic sheet between said upper and intermediate heating elements and said second frame means and its plastic sheet between said intermediate and lower heating elements whereby both sides of said sheets are heated to a temperature at which they can be fused together, said transfer means thereafter being operable to position said frame means and their respective heated sheets over the edges of said mold halves;
    means for applying a vacuum between said sheets and their respective mold cavities whereby said sheets are drawn into the confines of said respective mold cavities;
    and means for urging said mold halves together to cause said heated sheets to be engaged under pressure along the periphery of said hollow structure whereby said sheets are fused together in a seam along said periphery.

12. Apparatus as set forth in claim 11 that includes means for introducing air under superatmospheric pressure between said sheets.

13. Vacuum forming apparatus comprising: an oven having lower, intermediate and upper heating elements;
    a first pair of tracks extending between said lower and intermediate heating elements;
    a second pair of tracks extending between said intermediate and upper heating elements;
    first and second carriages movable on said first and second pairs of tracks, respectively, into and out of said oven;
    first and second frameworks on said first and second carriages, respectively, to carry first and second plastic sheets;
    means mounting at least one of said frameworks in a position movable on its carriage toward and away from the other of said frameworks;
    and first and second molds movable through said first and second frameworks, respectively;
    and means responsive to movement of one of said molds for moving said one of said frameworks toward the other thereof.

References Cited

UNITED STATES PATENTS

| | | | |
|---|---|---|---|
| 1,358,289 | 11/1920 | Cigol | 18—19 |
| 1,387,617 | 8/1921 | Roberts | 18—19 |
| 3,025,566 | 3/1962 | Kostur | 18—19 |
| 3,141,196 | 6/1964 | Langecker | 18—19 |
| 3,142,089 | 7/1964 | Wilkalis et al. | 18—19 |
| 3,156,012 | 11/1964 | Hritz | 18—19 |
| 3,179,980 | 4/1965 | Ryan et al. | 18—19 |
| 3,193,881 | 7/1965 | Kostur | 18—19 |
| 3,207,821 | 9/1965 | Jones-Hinton, et al. | 18—19 X |
| 3,242,245 | 3/1966 | Greig, et al. | |
| 3,250,660 | 5/1966 | Greig, et al. | 18—19 X |

WILLIAM J. STEPHENSON, *Primary Examiner.*